United States Patent [19]

Haneda

[11] Patent Number: 4,849,919

[45] Date of Patent: Jul. 18, 1989

[54] SYSTEM WAKE UP CIRCUIT FOR COMPUTER

[75] Inventor: Isamu Haneda, Soraku, Japan

[73] Assignee: Sharp Kabushiki Kaisha, Osaka, Japan

[21] Appl. No.: 872,878

[22] Filed: Jun. 11, 1986

[30] Foreign Application Priority Data

Jun. 14, 1985 [JP]  Japan ................................. 60-130319

[51] Int. Cl.⁴ ...................... G06F 15/16; G06F 15/06; G06F 13/34
[52] U.S. Cl. .................................. 364/569; 364/187; 364/267.9; 364/242.0; 371/12
[58] Field of Search ............... 364/200, 900, 569, 187; 371/11, 12, 14, 4, 16, 20, 24

[56] References Cited

U.S. PATENT DOCUMENTS

| 3,795,800 | 3/1974 | Nimmo | 371/12 |
| 4,486,826 | 12/1984 | Wolff et al. | 364/200 |
| 4,625,081 | 11/1986 | Lotito et al. | 379/88 |
| 4,669,082 | 5/1987 | Tilghman et al. | 371/11 |

Primary Examiner—Parshotam S. Lall
Assistant Examiner—Ellis B. Ramirez
Attorney, Agent, or Firm—Birch, Stewart, Kolasch & Birch

[57] ABSTRACT

An electronic apparatus such as a computer is of the type in which the computer is energized for wake up in accordance with a timer or an external key input. Prior to the system wake up by the timer or external key input, an alarm is generated for a predetermined time, indicating that the system wake up is being caused and the peripheral interface or machine should not be electrically coupled to the computer.

6 Claims, 1 Drawing Sheet

SYSTEM WAKE UP CIRCUIT FOR COMPUTER

BACKGROUND OF THE INVENTION

The present invention relates to a system wake up and, more particularly, to a system wake up circuit for an electornic apparatus such as a computer.

It is desired to automatically wake up a system for activating an electronic apparatus such as a computer, for example, in order to enable a schedule display at a constant time. Conventionally, a timer wake up is used for this purpose using a timer for automatically waking up the system. If such a timer wake up is started just at the time when a peripheral interface or machine is coupled to the system bus, the computer may run away, or otherwise the computer or the peripheral interface may be damaged. This is because the peripheral interface is electrically coupled with the energized computer when the timer wake up is used.

To prevent such a damage, a special key is operated for disabling the alarm wake up while the interface is coupled. However, the operation of such a key may be troblesome and further forgotten.

SUMMARY OF THE INVENTION

Accordingly, it is an object of the present invention to provide an improved system wake up means for an electronic apparatus.

It is another object of the present invention to provide an improved system wake up circuit for an electronic apparatus for automatically alarming that a peripheral interface should not be coupled to the computer system bus during the system wake up.

Briefly described, in accordance with the present invention, an electronic apparatus, such as a computer, is equipped with alarm means for alarming, for a predetermined time prior to a system wake up by a timer or an external input, that a peripheral interface or machine should not to be coupled to the computer system bus during the system wake up.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
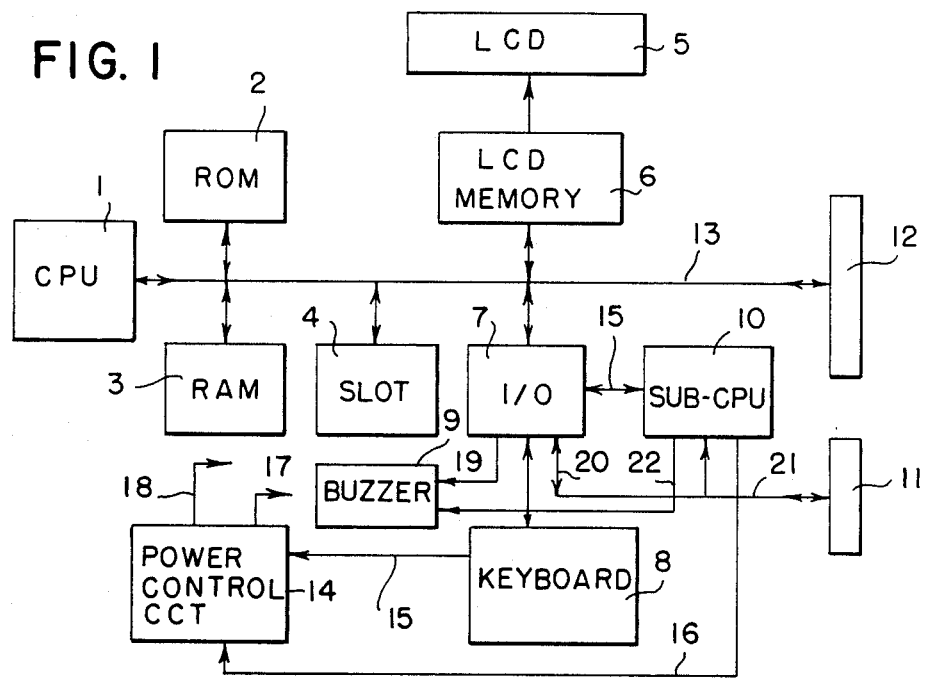
FIG. 1 is a block diagram of an electronic apparatus such as a computer with a system wake up means according to the present invention.

FIG. 1 is a block diagram of an electronic apparatus with a system wake up means of the present invention. By way of example, the electronic apparatus is referred to as a computer although not limited thereto.

Referring to FIG. 1, the computer comprises a Central Processing Unit (CPU) 1, a Read Only Memory (ROM) 2 for storing the proceeding program of this system, a Random Access Memory (RAM) 3 functioning as stacks, word areas of the system, and areas for users, an expanding slot 4 to which an additional ROM and RAM can be adapted to expand the function of the ROM and RAM, a liquid crystal display 5, and a memory 6 for the liquid crystal display 5. When the display data is inputted into the memory 6, the corresponding data can be displayed in the liquid crystal display 5. A keyboard 8, a buzzer 9, a sub-CPU 10 and a general-purpose I/O 11 are connected to an input/output (I/O) 7. The CPU 1 serves to scan the keyboard 8 via the I/O 7 to detect the key input, so that the buzzer 9 is activated and the data is communicated between the sub-CPU 11 and the general-purpose I/O 10 when the key input is detected.

An expanding I/O 12 is provided for connecting a peripheral interface or machine to thereby expand the capacity of the system. The expanding I/O 12 is connected to a system bus 13. A power control circuit 14 is provided which enables power transmission when a signal 15 from a power-ON key of the keyboard 8 and a power signal 16 from the sub-CPU 10 are made high. When the power control signal 16 is made low, the power transmission is stopped. An output signal 17 from the power control circuit 14 is continuously outputted regardless of the condition of the power control signal 16. The signal 17 is applied to the RAM 3 and the sub-CPU 10 so that the contents of the RAM 3 and the subCPU 10 are maintained even when this system is switched OFF. The output signal 18 from the power control circuit 14 is applied to the CPU 1 and the ROM 2 and the output signal 18 is not outputted when the system is ON (the power control signal 16 is made high). The I/O 7 provides a buzzer signal 19 for activating the buzzer 9.

A signal 20 is provided between the I/O 7 and the keyboard 8. A signal 21 is provided between the I/O 7 and the general/purpose I/O 11. The sub-CPU 10 provides a signal 22 for activating the buzzer 9.

The sub-CPU 10 has a timekeeping function, so that when the system is OFF, power is transmitted to the sub-CPU 10. The current time, the alarm time, the system OFF instruction to the sub-CPU 10, and the buzzer control instruction upon the timer wake up are all developed from the CPU 1 via the I/O 7.

Figure 2:
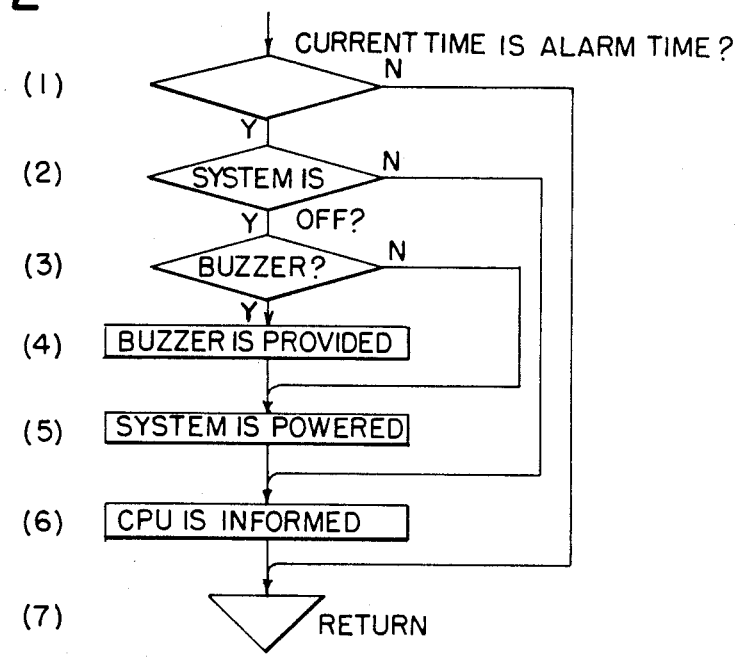
FIG. 2 is a flow chart of the operation of a sub-CPU updating the current time in the system wake up in the computer.

FIG. 2 is a flow chart of a subroutine for the operation of the sub-CPU 10 for updating the current time information.

When a timer interruption is caused in the sub-CPU 10, step (1) is selected.

Step (1): The current time information is updated. A comparison is made between the current time information and the alarm time information presently set. When the current time information and the alarm time information agrees, step (2) is selected. If the information does not agree, step (7) is executed and a return to the previous main routine occurs.

Step (2): A detection is made for determining whether this system is ON or OFF. When the system is ON, step (6) is executed in which the CPU 1 is informed as to whether the current time information agrees with the alarm time information by causing the interruption from the sub-CPU 10 into the CPU 1. When the system is OFF, step (3) is selected.

Step (3): A determination is made on whether the buzzer 9 is allowed to be activated upon the lapse of the alarm time information for the system wake up. If the buzzer 9 is set to be activated, step (4) is selected. If the buzzer 9 is not set, step (5) is selected.

Step (4): The buzzer 9 is activated for a predetermined time.

Step (5): The power transmission is possible. More particularly, the signal 16 is made high, so that the signal 18 from the power control circuit 14 is applied to the CPU 1 and the ROM 2 to thereby start the system.

Step (6): The CPU 1 is informed that the current time information agrees with the alarm set time information.

Step (7): The program is advanced from the current time information updating subroutine to the main routine when the interruption occurs.

Thus, the CPU 10 activates buzzer 9 when the current time information agrees with the alarm set time, so that thereafter the system power transmission is enabled. Therefore, upon the generation of the buzzer 9, the operator is informed that the peripheral machine or interface should not be coupled to the expanding I/O 12.

In place of the timer system wake up as described above, an external key input system for enabling the wake up can be applied. Upon the external key operation, the alarm is provided for a predetermined time, so that thereafter the system wake up is possible.

As described above, according to the present invention, the alarm is provided prior to the actuation of the system wake up for a predetermined time. Responsive to the alarm generation, the operator can refrain from coupling the peripheral interface or machine to the system bus. The computer cannot run over and the peripheral interface or machine cannot be damaged upon the wake up stage.

While only certain embodiments of the present invention have been described, it will be apparent to those skilled in the art that various changes and modifications may be made therein without departing from the spirit and scope of the present invention as claimed.

What is claimed is:

1. An electronic apparatus with peripheral interface means for selectively coupling additional hardware to the electronic apparatus, comprising:
   central processing means for controlling said electronic apparatus during a system on condition when power is transmitted to said central processing means;
   sub-central processing means for comparing a current time to an alarm time during a system off condition when power is prevented from being transmitted to said central processing means, said sub-central processing means initiating a wake up actuation when said current time and said alarm time are determined to be equal; and
   alarm means for providing an alarm for a predetermined period of time in response to initiator of said wake up actuation, said alarm indicating that selective coupling of additional hardware to said peripheral interface means should be withheld for said predetermined period of time.

2. The electronic apparatus of claim 1, further comprising keyboard means having an external key for initiating said wake up actuation.

3. The electronic apparatus of claim 1, wherein:
   said sub-central processing means enables power transmission to said central processing means in response to said wake up actuation being initiated.

4. A method for signaling that the selective coupling of additional hardware to peripheral interface means of an electronic apparatus should be withheld, comprising the steps of:
   controlling said electronic apparatus by a central processing means during a system on condition when power is transmitted to said central processing means;
   comparing a current time to an alarm time by sub-central processing means when power is prevented from being transmitted to said central processing means and determining if said current time and said alarm time are equal;
   initiating a wake actuation by said sub-central processing means in response to said current time and said alarm time are determined to be equal by said step of comparing; and
   providing an alarm for a predetermined period of time in response to said wake up actuation being initiated, said alarm indicating that the selective coupling of additional hardware to said peripheral interface means should be withheld for said predetermined period of time.

5. A method as defined in claim 4, further including the step of:
   transmitting power to said central processing means in response to said wake up actuation being initiated by said sub-central processing means.

6. A method as defined in claim 4, wherein the step of initiating said wake up actuation is provided when an external key from keyboard means is activated.

* * * * *